(12) United States Patent
Buchebner et al.

(10) Patent No.: US 6,482,760 B1
(45) Date of Patent: Nov. 19, 2002

(54) REFRACTORY CERAMIC MASS AND USE THEREOF

(75) Inventors: Gerald Buchebner; Dietmar Rumpf; Josef Deutsch, all of Leoben (AT)

(73) Assignee: Veitsch-Radex GmbH, Vienna (AT)

( * ) Notice: Subject to any disclaimer, the term of this patent is extended or adjusted under 35 U.S.C. 154(b) by 0 days.

(21) Appl. No.: 09/626,565

(22) Filed: Jul. 27, 2000

(51) Int. Cl.⁷ ................................................ C04B 35/04
(52) U.S. Cl. ...................................... 501/120; 501/112
(58) Field of Search ................................. 501/112, 120

(56) References Cited

U.S. PATENT DOCUMENTS

| | | | |
|---|---|---|---|
| 4,775,648 A | * 10/1988 | Bartha et al. | 501/112 |
| 4,971,934 A | 11/1990 | Schiavi et al. | |
| 5,569,631 A | * 10/1996 | Harmuth et al. | 501/112 |
| 5,723,394 A | 3/1998 | Harmuth et al. | |

FOREIGN PATENT DOCUMENTS

| | | |
|---|---|---|
| DE | 3527789 A1 | 2/1987 |
| DE | 4403869 C2 | 8/1995 |

* cited by examiner

*Primary Examiner*—Karl Group
(74) *Attorney, Agent, or Firm*—Craig G. Cochenour; Buchanan Ingersoll, P.C.

(57) ABSTRACT

The invention relates to a refractory ceramic mass comprising 60 to 99 MgO sinter and 1 and 40 wt.-% of a manganese containing spinel.

12 Claims, No Drawings

REFRACTORY CERAMIC MASS AND USE THEREOF

BACKGROUND OF THE INVENTION

1. Field of the Invention

The invention relates to a refractory ceramic mass as well as to its use.

2. Description of the Background Art

Specifically the invention relates to a basic refractory ceramic mass based on MgO sinter (sintered magnesia). MgO sinter is an essential component of all MgO and MgO-spinel-products. In mineralogy MgO sinter is called periclase. A main raw material for the production of MgO sinter is magnesite, i.e. magnesium carbonate or a synthetic magnesia basis respectively. To adapt specific material behaviours, specifically in order to improve the chemical resistance against slags, to improve ductility as well as temperature change resistance refractory ceramic masses based on MgO sinter in combination with various additional components are known. This includes chromite (chromic ore) for the production of so called magnesia chromite bricks. The advantages of such bricks are less brittleness and higher ductility respectively compared with pure magnesia bricks. Furthermore a better corrosion resistance against non basic slags is presented.

Although such products have been proofed in the past there is a permanent object to optimize refractory ceramic masses and workpieces (moulds) made thereof. For example products are required for the lining of industrial furnaces, wherein considerable mechanical forces onto said refractory lining may be expected, which brittleness being as small as possible. This Includes for example rotary kilns in cement industry where considerable mechanical forces onto the refractory lining may be expected because of a deformation of the furnace but as well furnaces in the steel- and non-ferrous metal industry, where mainly thermal stresses lead to problems during heat up and temperature changes.

If chromite containing products are used a relatively high content of alkalis and carburizing conditions, mainly based on the fuel used in an industrial furnace, lead to problems. The formation of alkali-chromate and alkali chromium sulphate as well as the presence of chromium VI present environmental problems.

Insofar $Al_2O_3$ containing products have been developed produced by the addition of alumina or Magnesium Aluminum Spinel ($MgAl_2O_4$) to a brick mixture (MgO-matrix). These qualities being free of chromium oxide partly present very good mechanical properties but they require mostly expensive and high quality raw materials.

DE 35 27 789 A1 describes ordinary ceramic workpieces within the manufacturing of which during the firing process minerals of the system $R^{+2}OxR_2^{3+}O_3$ are formed, wherein $R^{2+}$ shall be magnesium and iron and $R^{+3}$ aluminum, chromium and/or iron respectively. Besides an often unspecific formation of the said minerals during the firing process such bricks are as well not sufficiently alkali resistant or resistant against melts.

DE 44 03 869 C2 describes refractory masses and workpieces formed thereof, comprising, besides MgO sinter a pre-synthesized spinel of the hercynite-type. Such bricks have been proved extremely good especially because of their high micro-structural elasticity, But their resistance against alkali- or alkali salt attack should be better.

It is an object of the invention to provide a refractory ceramic mass, which, after being processed into burnt workpieces, provides mechanical properties and a ductility comparable with corresponding data of bricks according to DE 44 03 869 C2 and further presenting an improved resistance against alkali- or alkali salt attack. The brick should be usable in furnaces, in which an alkali- or alkali salt resistance especially in combination with a reduced thermal conductivity is required.

DESCRIPTION OF THE INVENTION

Surprisingly it has now been found that this object may be solved by a combination of a MgO sinter with at least one spinel of the Galaxite type (Mg, Mn) (Fe, Al)$_2O_4$ or Jacobsite type (Mg, Mn) (Fe, Al)$_2O_4$.

Correspondingly the invention relates in its most general embodiment ho a refractory ceramic mass, comprising a) 60 to 99 wt.-% MgO sinter, b) 1 to 40 wt.-% of at least one spinel of the Galaxite or Jacobsite type.

The MgO sinter may completely or partially be replaced by fused magnesia.

The at least one spinel is preferably added to the MgO sinter during processing as a pre-synthesized spinel, but it may as well be formed in-situ during firing.

According to an embodiment the proportions of MgO sinter are precised to 85 to 97 wt.-% and those of the spinels to 3 to 15 wt.-%.

The composition of the Galaxite or Galaxite-like spinel should be within the following ranges:

a) 25 to 55 wt.-% manganese, calculated as MnO, b) 45 to 70 wt.-% $Al_2O_3$, c) <15 wt.-% MgO, d) <5 wt.-% iron, calculated as FeO, e) remainder: impurities.

Thus, an example of the composition of the spinel is:

a) 51 wt.-% $Al_2O_3$, b) 39 wt.-% MnO, c) 1 wt.-% MgO, d) 4 wt.-% FeO+$Fe_2O_3$, e) remainder: impurities.

The composition of the Jacobsite or the Jacobsite like spinel is given as follows:

a) 15 to 35 wt.-% manganese, calculated as MnO, b) 60 to 70 wt.-% iron, calculated as $Fe_2O_3$, c) <22 wt.-% MgO, d) remainder: impurities.

Thus, an example of the composition of said spinel may be as follows:

a) 23 to 30 wt.-% manganese, calculated as MnO, b) 66 to 70 wt.-% iron, calculated as $Fe_2O_3$, c) <15 wt.-% MgO, d) remainder: impurities.

In any case the components of the spinels mentioned add each other to 100 wt.-%.

Further embodiments of the invention provide for use of at least one spinel as a fused spinel; but as well a sintered spinel may be used.

While the MgO sinter should be used in a grain fraction <8 mm and, according to an embodiment, <5 mm, it has been found useful to provide the spinel(s) in a smaller fraction compared with the MgO sinter, whereby the upper grain size should be about 5 mm.

Thus, a partial fraction of the MgO sinter may be provided as a fine fraction <125 μm, whereby this part may be 10 to 35 wt.-%, according to an embodiment: 15 to 30 wt.-%, related to the mass in total.

The reaction and sinter mechanism are not yet fully understood. The improved mechanical properties as required and achieved may be explained according to actual knowledge that no complete dense sintering is achieved between individual mass components so that even the fired, refractory workpiece, produced on the basis of said mass, keeps a certain "elasticity" (flexibility). Because of different elasticity modulus of the sinter and the spinel respectively cracks, if any, may be formed just under mechanical load.

The ductility of fired refractory bricks, produced by use of said new mass present a ductility similar to those of bricks according to DE 44 03 869 C2.

Bricks according to the invention specifically present a strong reduction in corrosion by alkalis and alkali salts. In a practice-oriented laboratory test bricks according to the invention comprising a high MnO content of that Galaxite spinel have been tested against alkali salts of the system $K_2O$—$Na_2O$—Cl—S.

In subsequent mineralogical tests a characteristically improved alkali resistance could be registered compared with hercynite-spinel-MgO-bricks.

Additionally, the thermal conductivity of said bricks is favourably reduced.

When a Jacobsite spinel was used the alkali resistance could further be improved. The alkali resistance is related to the refractory brick material in total, that means for example as well to possible (further) components such as an MgO×$Al_2O_3$-addition to the refractory brick mass.

Compared with conventional bricks on basis MgO in combination with an MgO×$Al_2O_3$-spinel the thermal conductivity could be educed up to 50% and is about 3,7 W/mK at 200° C. and 3,2 W/mK at 800° C.

It has further to be pointed out that along the temperature range stated (for example 200 to 800° C.) low and nearly constant thermal conductivity is achieved. While the thermal conductivity with said disclosed conventional bricks based on 84 wt.-% MgO and 16 wt.-% MgO—$Al_2O_3$-spinel was reduced from 6,5 W/mK (200° C.) to 4 W/mK (800° C.), i.e., about one/third, the comparative figures of a brick comprising 92 wt.-% MgO and 8 wt.-% Jacobsite spinel where 3,7 and 3,2 W/mK respectively, corresponding a reduction of just about 15%.

Further the bricks present a good hot corrosion durability.

This all makes its use as a lining material in cement rotary kilns especially suitable.

We claim:

1. Refractory ceramic mass, comprising:
   a) 60 to 99 wt.-% MgO-sinter,
   b) 1 to 40 wt.-% of at least one Galaxite- or Jacobsite spinel.

2. The refractory ceramic mass according to claim 1, comprising:
   a) 85 to 97 wt.-% MgO sinter,
   b) 3 to 15 wt.-% of at least one Galaxite- or Jacobsite spinel.

3. The refractory ceramic mass according to claim 1, wherein the Galaxite spinel comprises:
   a) 25 to 55 wt.-% manganese, calculated as MnO,
   b) 45 to 65 wt.-% $Al_2O_3$,
   c) <15 wt.-% MgO,
   d) <5 wt.-% iron, calculated as FeO,
   e) the remainder being impurities.

4. The refractory ceramic mass according to claim 3, wherein the Galaxite spinel comprises:
   a) 35 to 42 wt.-% manganese, calculated as MnO,
   b) 45 to 55 wt.-% $Al_2O_3$,
   c) <5 wt.-% MgO,
   d) <5 wt.-% iron, calculated as FeO,
   e) the remainder being impurities.

5. The refractory ceramic mass according to claim 1, wherein the Jacobsite spinel comprises:
   a) 15 to 35 wt.-% manganese, calculated as MnO,
   b) 60 to 70 wt.-% iron, calculated as $Fe_2O_3$,
   c) <22 wt.-% MgO,
   d) the remainder being impurities.

6. The refractory ceramic mass according to claim 1, wherein the Jacobsite spinel comprises:
   a) 23 to 30 wt.-% manganese, calculated as MnO,
   b) 66 to 70 wt.-% iron, calculated as $Fe_2O_3$,
   c) <15 wt.-% MgO,
   d) the remainder being impurities.

7. The refractory ceramic mass according to claim 1, wherein the at least one spinel is a fused spine.

8. The refractory ceramic mass according to claim 1, wherein the MgO sinter is provided in a grain fraction <8 mm and wherein the at least one spinel is provided in a grain fraction <5 mm.

9. The refractory ceramic mass according to claim 1, wherein the MgO sinter is provided in a grain fraction <5 mm.

10. The refractory ceramic mass according to claim 1, wherein the at least one spinel is provided in a grain fraction <3 mm.

11. The refractory ceramic mass according to claim 1, wherein the MgO sinter is at least partially replaced by fused magnesia.

12. The refractory ceramic mass according to claim 1, being free of chromium-containing components.

* * * * *

UNITED STATES PATENT AND TRADEMARK OFFICE
CERTIFICATE OF CORRECTION

PATENT NO. : 6,482,760 B1
DATED : November 19, 2002
INVENTOR(S) : Gerald Buchebner, Dietmar Rumpf and Josef Deutsch It is certified that error appears in the above-identified patent and that said Letters Patent is hereby corrected as shown below:

<u>Title page,</u>
Insert Item:
-- [30] Foreign application Priority Data
        Nov. 24, 1999  (WO)  PCT/EP99/09081
        Dec. 22, 1998  (DE)  198 59 372.4
        Nov. 30, 1998  (DE)  198 54 971.7 --

Signed and Sealed this

Twenty-second Day of June, 2004

JON W. DUDAS
*Acting Director of the United States Patent and Trademark Office*